(12) United States Patent  (10) Patent No.: US 7,813,125 B2
Huang  (45) Date of Patent: Oct. 12, 2010

(54) LATCH MECHANISM FOR LATCHING A MONITOR AND A HOST OF A PORTABLE COMPUTER

(75) Inventor: Hung-Ming Huang, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 205 days.

(21) Appl. No.: 12/323,445

(22) Filed: Nov. 25, 2008

(65) Prior Publication Data

US 2010/0008033 A1  Jan. 14, 2010

(30) Foreign Application Priority Data

Jul. 9, 2008  (TW) .............................. 97125934 A (51) Int. Cl.
   *G06F 1/16* (2006.01)
   *H05K 5/00* (2006.01)
   *H05K 7/00* (2006.01)
(52) U.S. Cl. ............................. 361/679.58; 361/679.55
(58) Field of Classification Search ............ 361/679.27, 361/679.55, 679.58; 292/251.5
   See application file for complete search history.

(56) References Cited

U.S. PATENT DOCUMENTS

| 6,108,196 | A | * | 8/2000 | Jung | ...................... | 361/679.55 |
| 6,115,239 | A | * | 9/2000 | Kim | ...................... | 361/679.57 |
| 6,659,516 | B2 | * | 12/2003 | Wang et al. | ............... | 292/251.5 |
| 6,762,928 | B2 | * | 7/2004 | Lo | ......................... | 361/679.58 |
| 6,937,465 | B2 | * | 8/2005 | Park | ...................... | 361/679.08 |
| 6,965,512 | B2 | * | 11/2005 | Huang et al. | ........... | 361/679.59 |
| 7,164,578 | B2 | * | 1/2007 | Wang et al. | ............. | 361/679.08 |
| 7,181,238 | B2 | * | 2/2007 | Chiang | .................... | 455/556.1 |
| 7,495,898 | B2 | * | 2/2009 | Lo et al. | ................. | 361/679.55 |
| 7,604,264 | B2 | * | 10/2009 | Lin et al. | ........................ | 292/1 |
| 7,656,663 | B2 | * | 2/2010 | Zhao et al. | .............. | 361/679.58 |
| 2002/0089190 | A1 | * | 7/2002 | Wang et al. | ............... | 292/251.5 |
| 2003/0142472 | A1 | * | 7/2003 | Park | ........................... | 361/683 |
| 2005/0152120 | A1 | * | 7/2005 | Lee | ............................. | 361/725 |
| 2005/0276010 | A1 | * | 12/2005 | Song | .......................... | 361/683 |
| 2006/0002062 | A1 | * | 1/2006 | Kwon et al. | ................ | 361/680 |
| 2010/0008041 | A1 | * | 1/2010 | Wang | .................... | 361/679.58 |

* cited by examiner

*Primary Examiner*—Jayprakash N Gandhi
*Assistant Examiner*—Adrian S Wilson
(74) *Attorney, Agent, or Firm*—Winston Hsu; Scott Margo; Min-Lee Teng (57) ABSTRACT

A latch mechanism includes at least one pin disposed on a monitor for inserting in a hole on a host, at least one first rod disposed inside the host, at least one second rod disposed inside the host, a pushing component disposed inside the host, and a first elastic component disposed inside the host and connected to the pushing component for providing elastic force to the pushing component. A first end of the first rod is for fixing the pin. A first end of the second rod is connected to a second end of the first rod. The pushing component is connected to a second end of the second rod for pushing the second rod so as to drive the first rod and the second rod to rotate on a plane where the pushing component is pushed so that the first end of the first rod separates from the pin.

19 Claims, 10 Drawing Sheets

LATCH MECHANISM FOR LATCHING A MONITOR AND A HOST OF A PORTABLE COMPUTER

BACKGROUND OF THE INVENTION

1. Field of the Invention

The present invention relates to a latch mechanism, and more particularly, to a latch mechanism for latching a monitor and a host of a portable computer.

2. Description of the Prior Art

Figure 1:
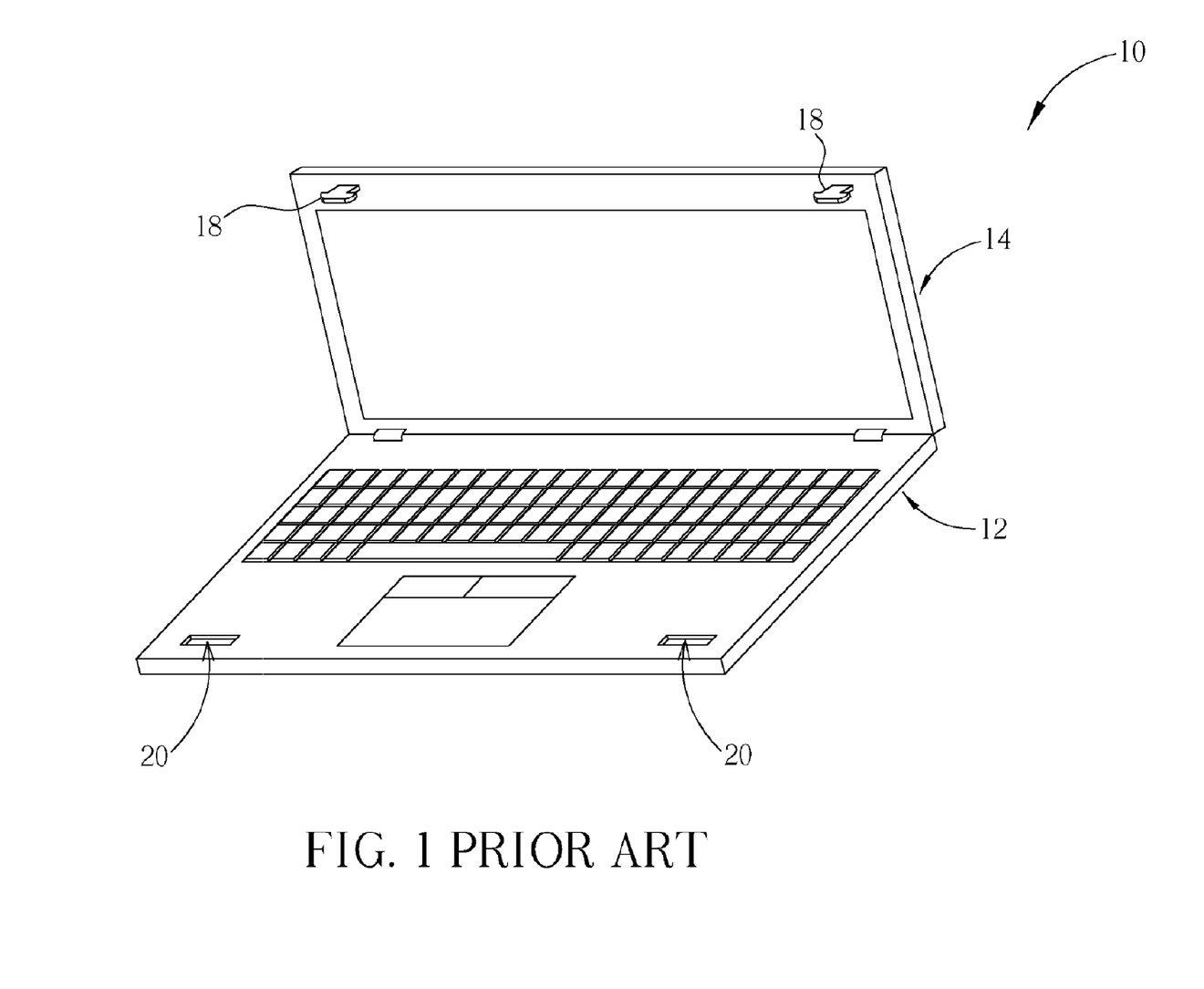
FIG. 1 is a schematic diagram of a portable computer in the prior art.
Figure 2:
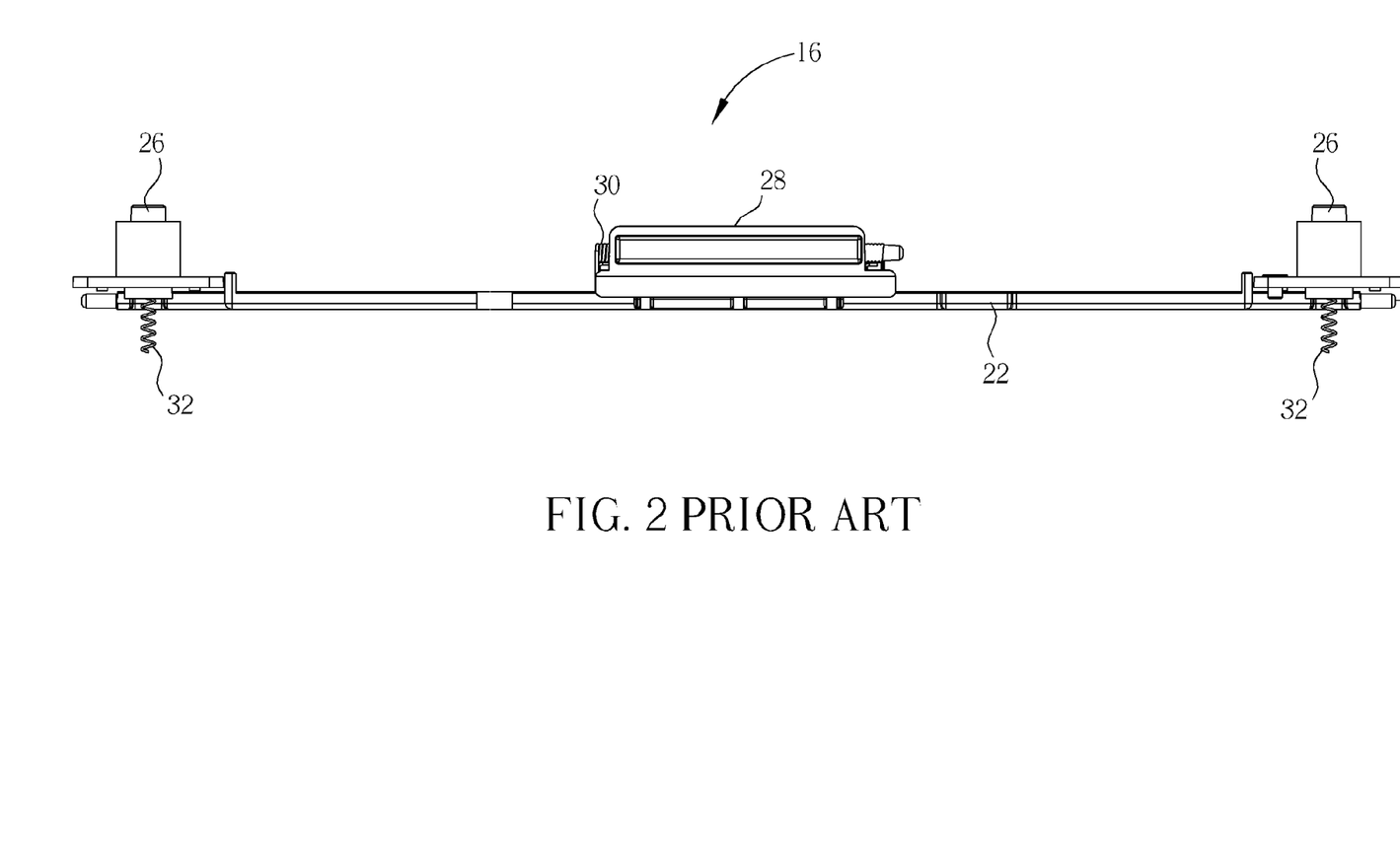
FIG. 2 to FIG. 4 are drawings of a latch mechanism for latching a monitor and a host at different view angles in the prior art.
Figure 3:
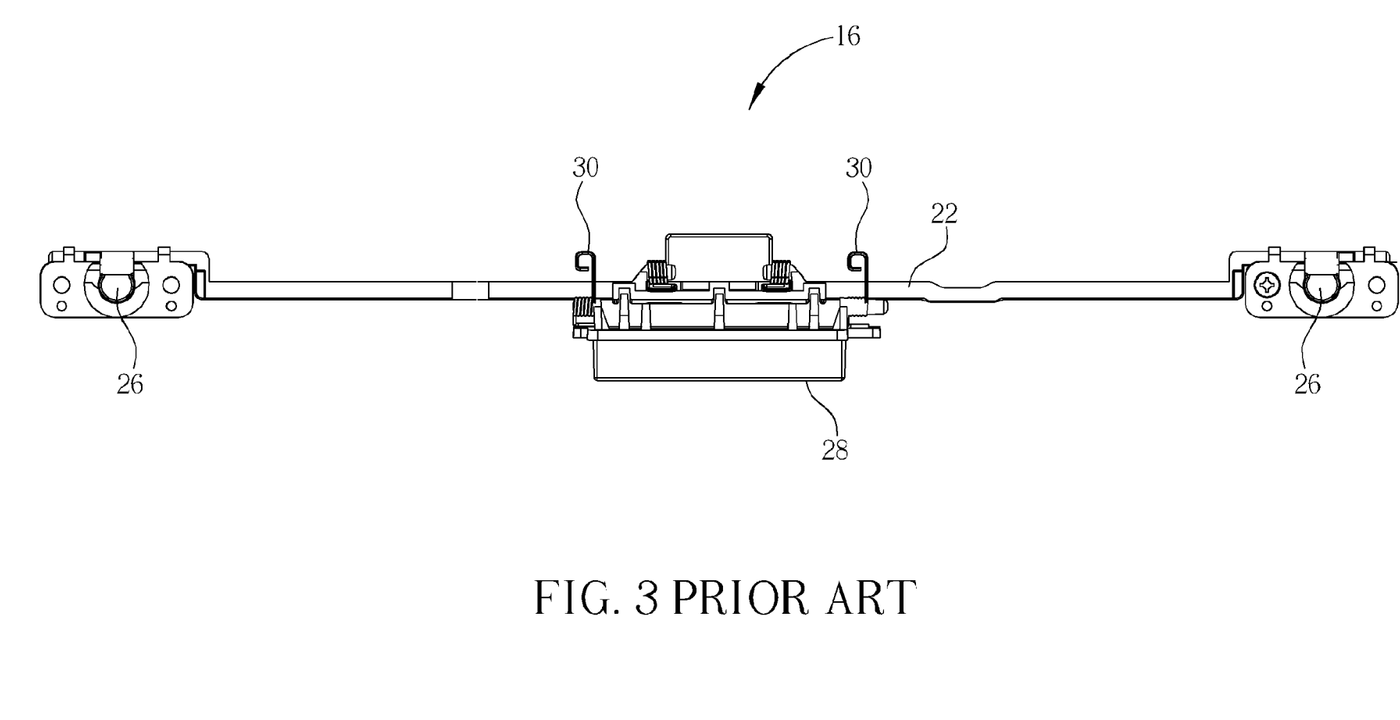
Figure 4:
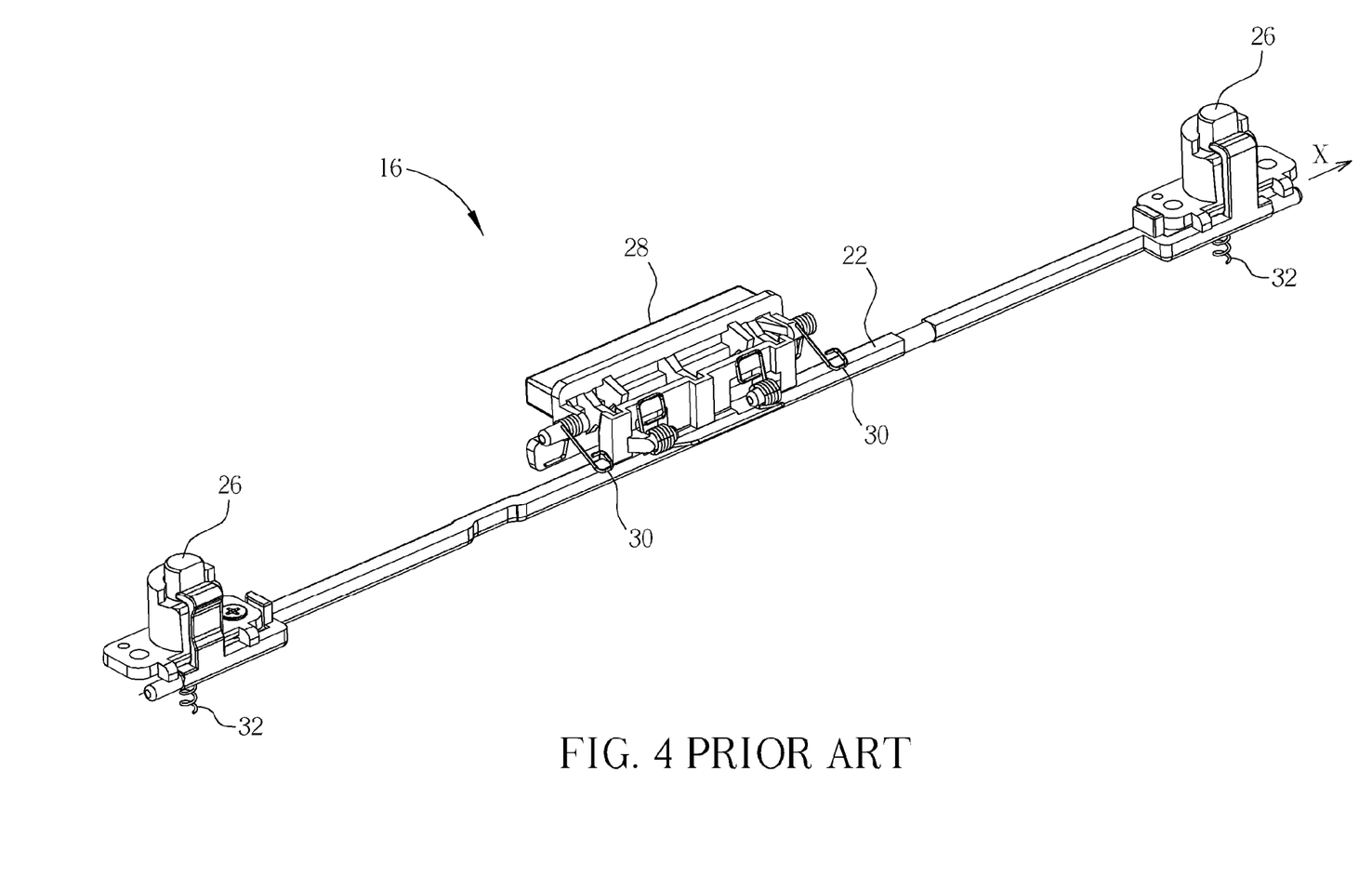

Please refer to FIG. 1. FIG. 1 is a schematic diagram of a portable computer 10 in the prior art. The portable component 10 includes a host 12, and a monitor 14 connected to the host 12 in a rotatable manner. Please refer to FIG. 1 to FIG. 4. FIG. 2 to FIG. 4 are drawings of a latch mechanism 16 for latching the monitor 14 and the host 12 at different view angles in the prior art. The latch mechanism 16 includes two pins 18 disposed on the monitor 14 for inserting into two holes 20 on the host 12 respectively. The latch mechanism 16 further includes a rod 22 installed inside the host 12. Both sides of the rod 22 fix the two pins 18 respectively when the two pins 18 insert into the two holes 20 on the host 12 respectively.

Figure 5:
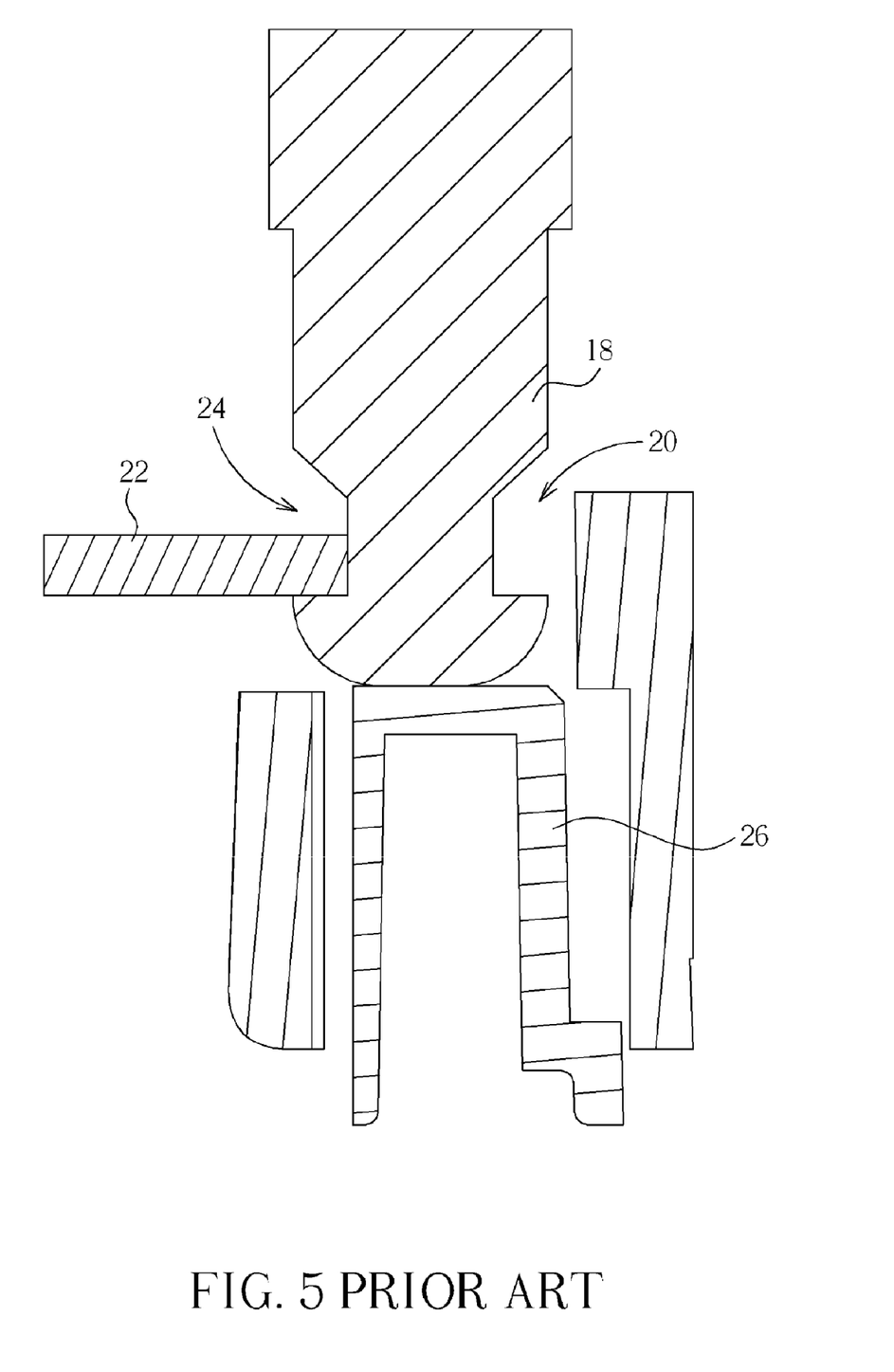
FIG. 5 is a sectional view of an end of a rod wedging with a pin in the prior art.

Please refer to FIG. 5. FIG. 5 is a sectional view of an end of the rod 22 wedging with the pin 18 in the prior art. An indentation 24 is formed on the pin 18, and one end of the rod 22 can wedge in the indentation 24 on the pin 18 so as to latch the monitor 14 on the host 12. At this time, a user can not lift the monitor 14. The latch mechanism 16 further includes two bosses 26 disposed inside the host 12 and below the two holes 20 respectively. The pin 18 is capable of pressing down the boss 26 when inserting into the hole 20 on the host 12. Please continue referring to FIG. 1 to FIG. 5. The latch mechanism 16 further includes a pushing component 28 which can be a button. The pushing component 28 is disposed inside the host 12 and located on a side of the rod 22 for pushing the rod 22 to twist relative to an X axis as shown in FIG. 4 so that both ends of the rod 22 separate from the pins 18, the latch mechanism 16 can not latch the monitor 14, and the user can lift the monitor 14. The latch mechanism 16 further includes two first elastic components 30 disposed inside the host 12 and connected to the pushing component 28. The first elastic component 30 can be a torsional spring for providing elastic force to the pushing component 28. When the pushing component 28 is released, the rod 22 can rotate reversely to restore to an original condition. The latch mechanism 16 further includes two second elastic components 32 disposed inside the host 12 and below the two bosses 26 respectively. The second elastic component 32 can be a spring for providing elastic force to the boss 26 so as to push the boss 26 to wedge in the hole 20 when the pin 18 does not insert in the hole 20 on the host 12. The boss 26 can fill the vacancy of the hole 20 on the host 12 for maintaining aesthetic feeling of outward appearance.

However, the rod of the conventional latch mechanism has a long arm resulting in imprecise action so that the user can not operate the latch mechanism smoothly. There is a need to design a latch mechanism with a precise action.

SUMMARY OF THE INVENTION

According to the claimed invention, a latch mechanism includes at least one pin disposed on a monitor for inserting in a hole on a host, at least one first rod disposed inside the host, at least one second rod disposed inside the host, a pushing component disposed inside the host, and a first elastic component disposed inside the host and connected to the pushing component for providing elastic force to the pushing component. A first end of the first rod is for fixing the pin. A first end of the second rod is connected to a second end of the first rod. The pushing component is connected to a second end of the second rod for pushing the second rod so as to drive the first rod and the second rod to rotate on a plane where the pushing component is pushed so that the first end of the first rod separates from the pin.

These and other objectives of the present invention will no doubt become obvious to those of ordinary skill in the art after reading the following detailed description of the preferred embodiment that is illustrated in the various figures and drawings.

DETAILED DESCRIPTION

Figure 6:
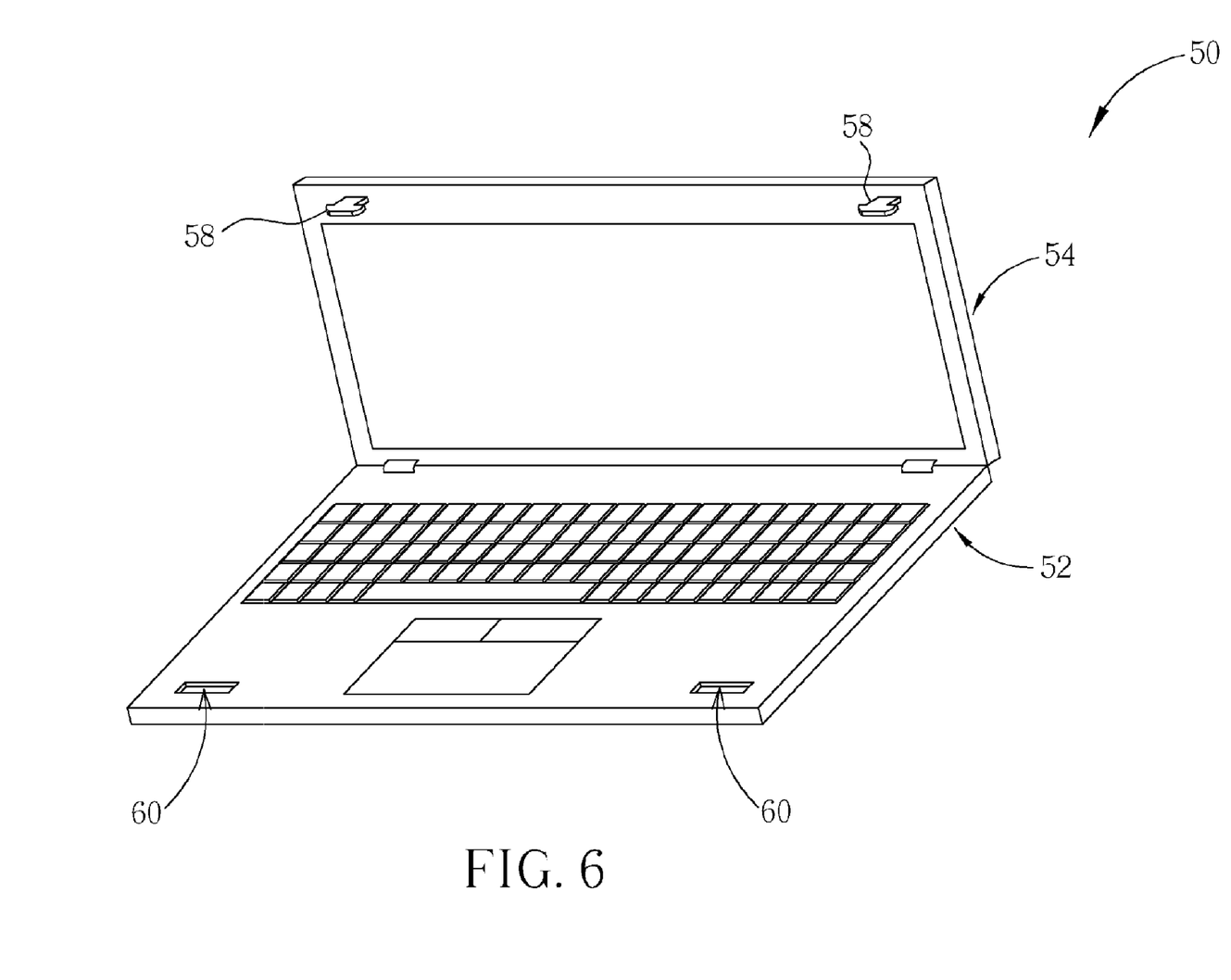
FIG. 6 is a schematic diagram of a portable computer according to a preferred embodiment of the present invention.
Figure 7:
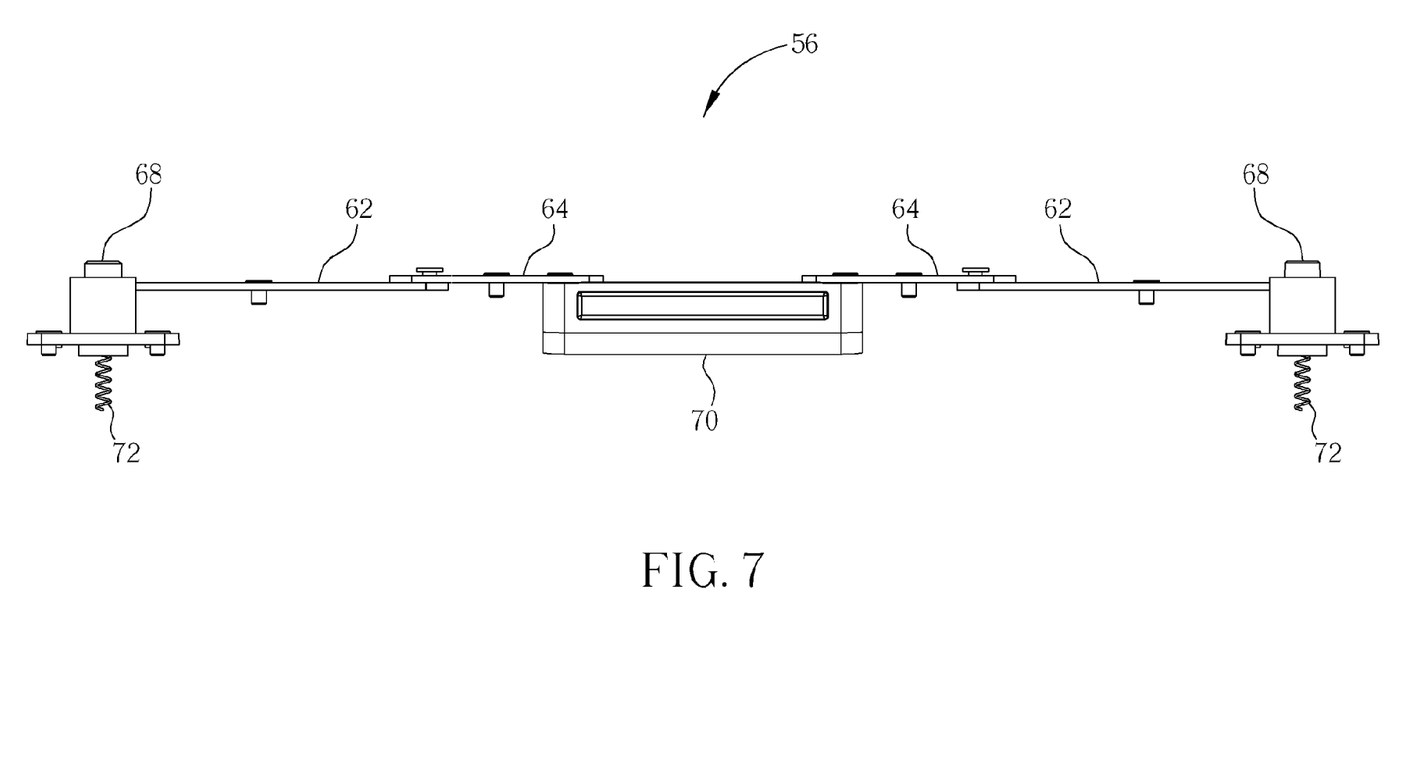
FIG. 7 to FIG. 9 are drawings of a latch mechanism for latching a monitor and a host at different view angles according to the preferred embodiment of the present invention.
Figure 8:
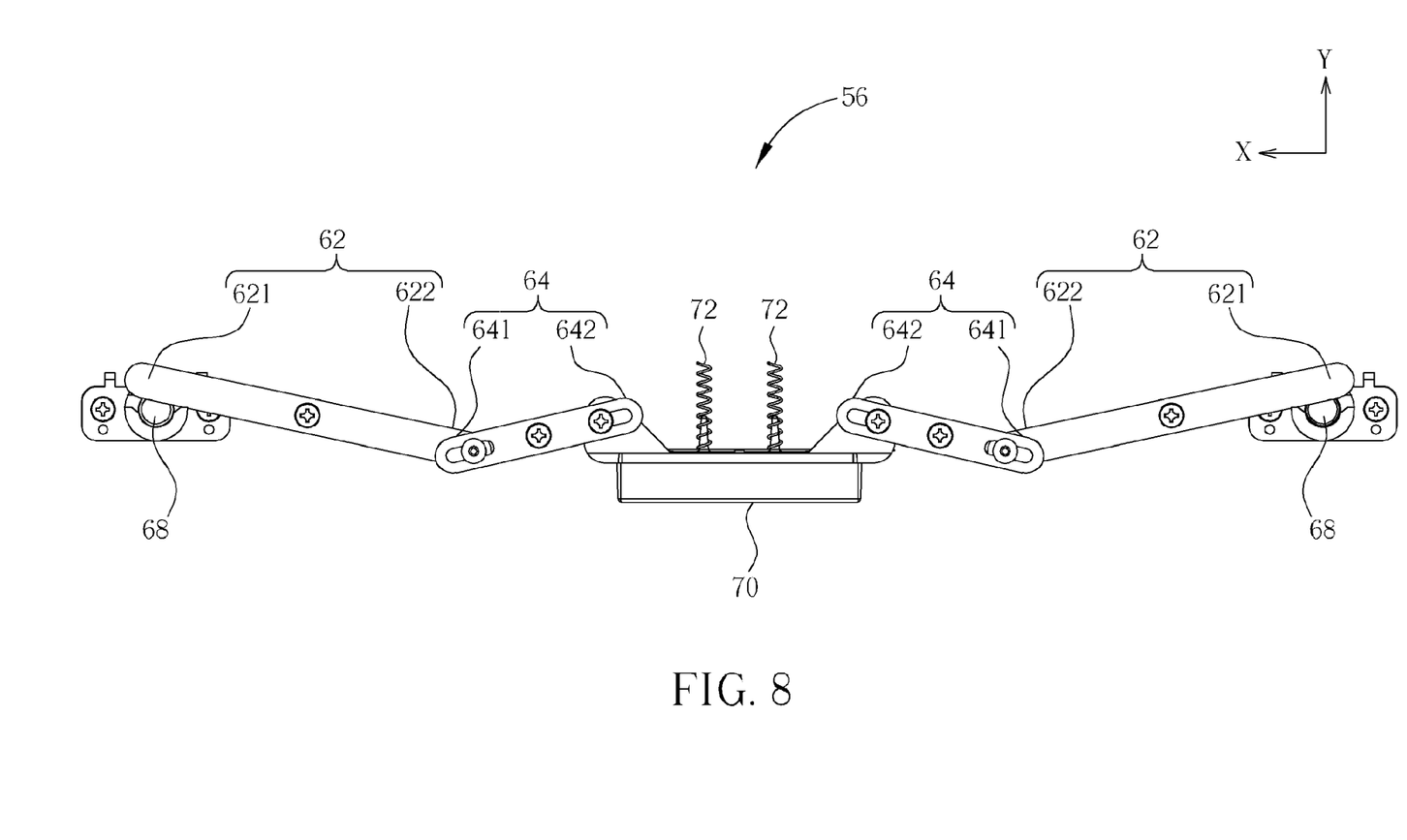
Figure 9:
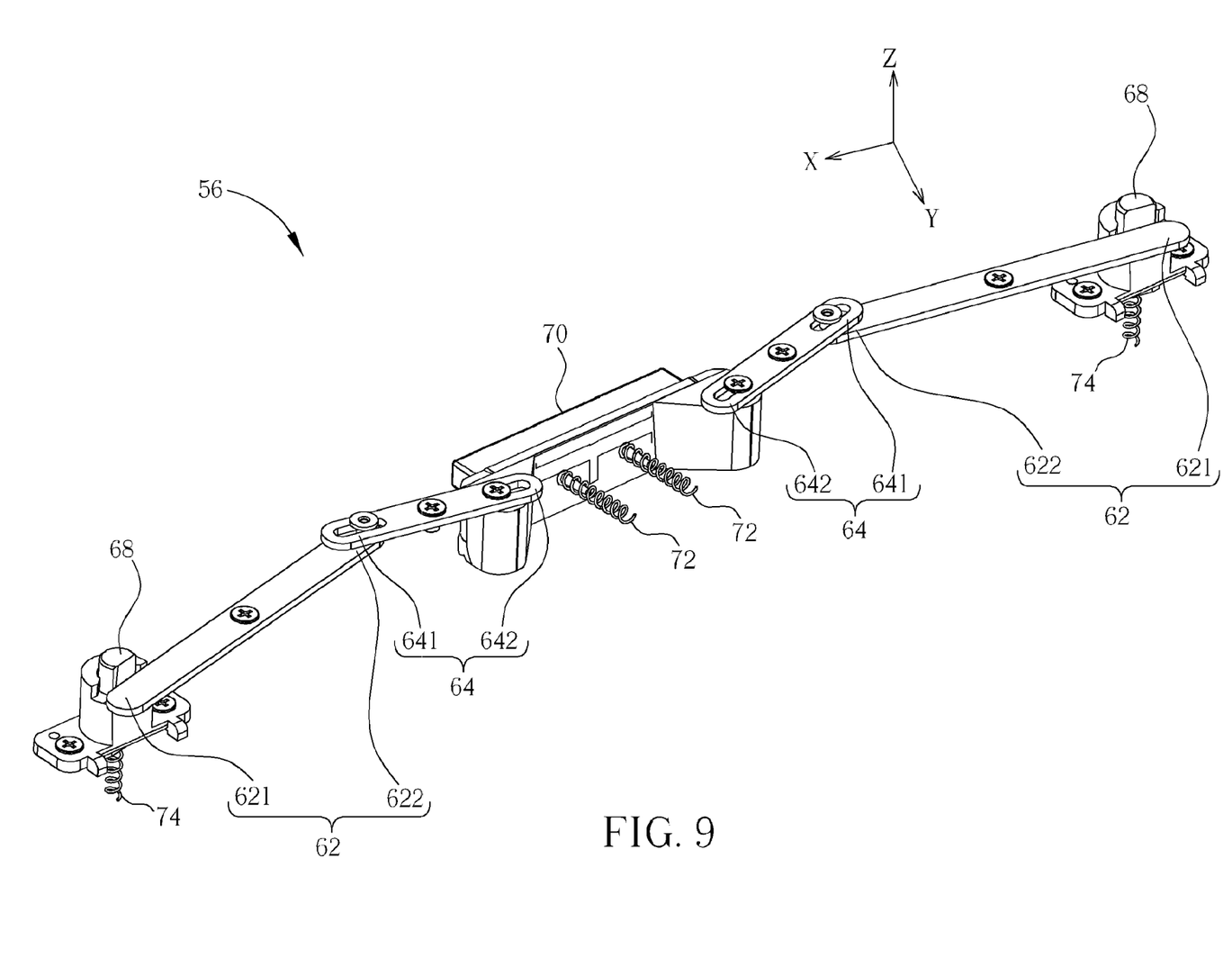

Please refer to FIG. 6. FIG. 6 is a schematic diagram of a portable computer 50 according to a preferred embodiment of the present invention. The portable component 50 can be a notebook computer. The portable computer 50 includes a host 52, and a monitor 54 connected to the host 52 in a rotatable manner. Please refer to FIG. 7 to FIG. 9. FIG. 7 to FIG. 9 are drawings of a latch mechanism 56 for latching the monitor 54 and the host 52 at different view angles according to the preferred embodiment of the present invention. The latch mechanism 56 includes two pins 58 disposed on the monitor 54 for inserting into two holes 60 on the host 52 respectively. The latch mechanism 56 further includes two first rod 62 installed inside the host 52. A first end 621 of each first rod 62 can fix the pin 58 when the pin 58 inserts into the hole 60 on the host 52. The latch mechanism 56 further includes two second rods 64 disposed inside the host 52. A first end 641 of each second rod 64 is connected to a second end 622 of the first rod 62.

Figure 10:
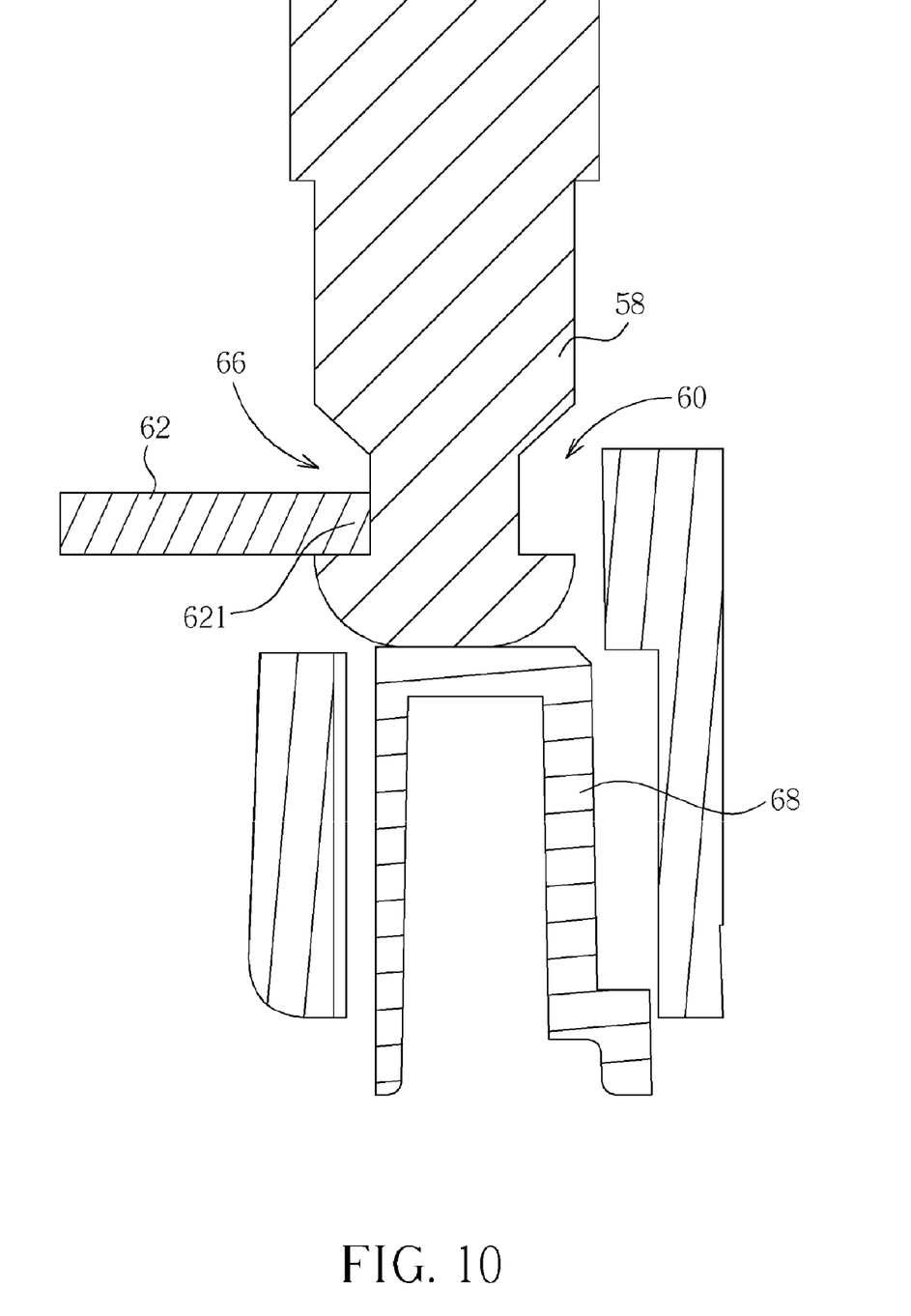
FIG. 10 is a sectional view of a first end of a first rod wedging with a pin according to the preferred embodiment of the present invention.

Please refer to FIG. 10. FIG. 10 is a sectional view of the first end 621 of the first rod 62 wedging with the pin 58 according to the preferred embodiment of the present invention. An indentation 66 is formed on the pin 58, and the first end 621 of the first rod 62 can wedge in the indentation 66 on the pin 58 so as to latch the monitor 54 on the host 52. At this time, a user can not lift the monitor 54. The latch mechanism 56 further includes two bosses 68 disposed inside the host 52 and below the two holes 60 respectively. The pin 58 is capable of pressing down the boss 68 when inserting into the hole 60 on the host 52. Please continue referring to FIG. 6 to FIG. 10. The latch mechanism 56 further includes a pushing component 70 which can be a button. The pushing component 70 is disposed inside the host 52 and connected to a second end 642 of each second rod 64 for pushing the second rod 64 so as to drive the second rod 64 and the first rod 62 to rotate on a plane where the pushing component 70 is pushed (X-Y plane or rotating relative to Z axis). That is, rotating directions of the first rod 62 and the second rod 64 are perpendicular to a moving direction of the pin 58 inside the hole 60 substantially. The rotating directions of the first rod 62 and the second rod 64 are contrary to each other. It can make the first end 621 of the first rod 62 separate from the pin 58 so that the latch mechanism 56 can not latch the monitor 54 and the user can lift the monitor 54.

The latch mechanism 56 further includes two first elastic components 72 disposed inside the host 52 and connected to the pushing component 70. The first elastic component 72 can be a spring for providing elastic force to the pushing component 70. When the pushing component 70 is released, the first rod 62 and the second rod 64 can rotate reversely to restore to an original condition. The latch mechanism 56 further includes two second elastic components 74 disposed inside the host 52 and below the two bosses 68 respectively. The second elastic component 74 can be a spring for providing elastic force to the boss 68 so as to push the boss 68 to wedge in the hole 60 when the pin 58 does not insert in the hole 60 on the host 52. The rotating directions of the first rod 62 and the second rod 64 are perpendicular to a moving direction of the boss 68 pushed by the second elastic component 74 substantially (Z-axis). The boss 68 can fill the vacancy of the hole 60 on the host 52 for maintaining aesthetic feeling of outward appearance. For example, the material and the color of the boss 68 can be the same as the ones of a housing of the host for maintaining aesthetic feeling of outward appearance.

In contrast to the prior art, the latch mechanism of the present invention utilizes a linkage set instead of a single rod for solving the problem of imprecise action due to the long arm of the single rod. In addition, the motion of the linkage set of the present invention is a planar rotation instead of a torsion motion of the single rod in the prior art so that the latch mechanism of the present invention is capable of acting precisely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A latch mechanism comprising:
    at least one pin disposed on a monitor for inserting in a hole on a host;
    at least one first rod disposed inside the host, a first end of the first rod being for fixing the pin;
    at least one second rod disposed inside the host, a first end of the second rod being connected to a second end of the first rod;
    a pushing component disposed inside the host and connected to a second end of the second rod for pushing the second rod so as to drive the second rod and the first rod to rotate on a plane where the pushing component is pushed so that the first end of the first rod separates from the pin; and
    a first elastic component disposed inside the host and connected to the pushing component for providing elastic force to the pushing component.

2. The latch mechanism of claim 1 wherein an indentation is formed on the pin and the first end of the first rod is for inserting into the indentation.

3. The latch mechanism of claim 1 further comprising:
    at least one boss disposed inside the host, the pin pressing down the boss when the pin inserts into the hole on the host; and
    at least one second elastic component disposed inside the host and connected to the boss for providing elastic force to the boss so as to push the boss to wedge in the hole when the pin does not insert in the hole.

4. The latch mechanism of claim 3 wherein the second elastic component is a spring.

5. The latch mechanism of claim 3 wherein rotating directions of the first rod and the second rod are perpendicular to a moving direction of the boss pushed by the second elastic component substantially.

6. The latch mechanism of claim 1 wherein rotating directions of the first rod and the second rod are contrary to each other.

7. The latch mechanism of claim 1 wherein rotating directions of the first rod and the second rod are perpendicular to a moving direction of the pin inside the hole substantially.

8. The latch mechanism of claim 1 wherein the pushing component is a button.

9. The latch mechanism of claim 1 wherein the first elastic component is a spring.

10. A portable computer comprising:
    a monitor whereon a pin is disposed; and
    a host, the monitor being pivoted to the host, and the host comprising:
        a housing, a hole being formed on the housing and located in a position corresponding to the pin, and the pin being for inserting into the hole;
        at least one first rod disposed inside the host, a first end of the first rod being for fixing the pin;
        at least one second rod disposed inside the host, a first end of the second rod being connected to a second end of the first rod;
        a pushing component disposed on the housing and connected to a second end of the second rod for pushing the second rod so as to drive the second rod and the first rod to rotate on a plane where the pushing component is pushed so that the first end of the first rod separates from the pin; and
        a first elastic component disposed inside the host and connected to the pushing component for providing elastic force to the pushing component.

11. The portable computer of claim 10 wherein an indentation is formed on the pin and the first end of the first rod is for inserting into the indentation.

12. The portable computer of claim 10 further comprising:
    at least one boss disposed inside the host, the pin pressing down the boss when the pin inserts into the hole on the host; and
    at least one second elastic component disposed inside the host and connected to the boss for providing elastic force to the boss so as to push the boss to wedge in the hole when the pin does not insert in the hole.

13. The portable computer of claim 12 wherein the second elastic component is a spring.

14. The portable computer of claim 12 wherein rotating directions of the first rod and the second rod are perpendicular to a moving direction of the boss pushed by the second elastic component substantially.

15. The portable computer of claim 10 wherein rotating directions of the first rod and the second rod are contrary to each other.

16. The portable computer of claim 10 wherein rotating directions of the first rod and the second rod are perpendicular to a moving direction of the pin inside the hole substantially.

17. The portable computer of claim 10 wherein the pushing component is a button.

18. The portable computer of claim 10 wherein the first elastic component is a spring.

19. The portable computer of claim 10 being a notebook computer.

* * * * *